C. F. MARTINE.
BOOT OR SHOE.
No. 10,919. Reissued Apr. 3, 1888.
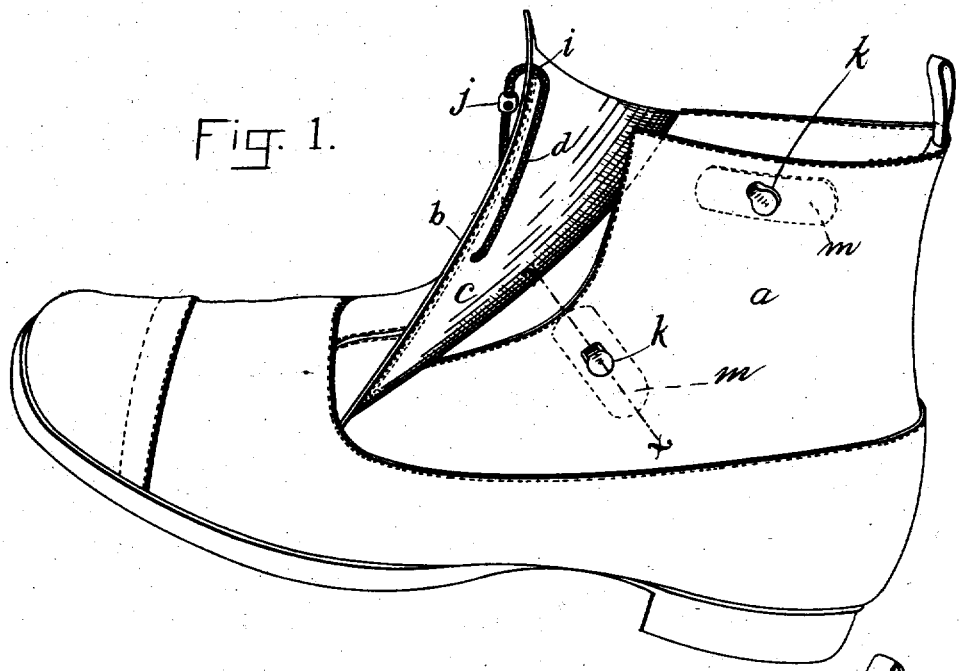
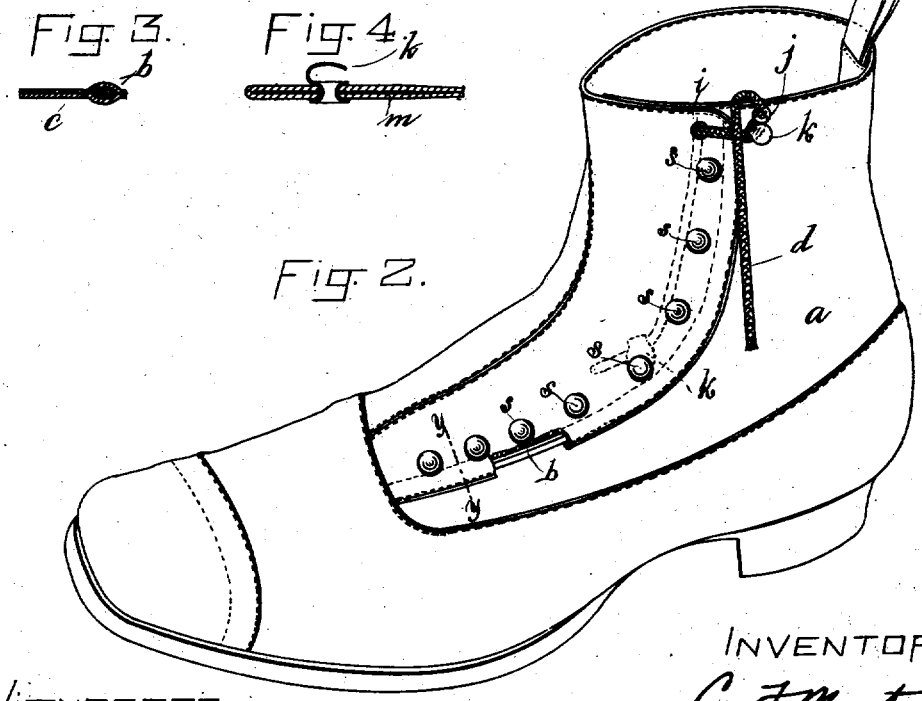
WITNESSES.
A. D. Harrison.
H. B. Ramsay.
INVENTOR.
C. F. Martine
by Wright Brown & Quinby
Attys.
N. PETERS, Photo-Lithographer, Washington, D. C.

UNITED STATES PATENT OFFICE.

CHARLES F. MARTINE, OF BOSTON, MASSACHUSETTS.

BOOT OR SHOE.

SPECIFICATION forming part of Reissued Letters Patent No. 10,919, dated April 3, 1888.

Original No. 369,068, dated August 30, 1887. Application for reissue filed February 7, 1888. Serial No. 263,291.

*To all whom it may concern:*

Be it known that I, CHARLES F. MARTINE, of Boston, in the county of Suffolk and State of Massachusetts, have invented certain new and useful Improvements in Boots or Shoes, of which the following is a specification.

This invention relates to boots having an opening in the quarter, one edge or side of which overlaps the other, as in the ordinary button-boot.

The object of the invention is to enable a boot of this class to be more quickly and conveniently fastened and unfastened than a button-boot; and to this end it consists in the improvements which I will now proceed to describe and claim.

Of the accompanying drawings, forming a part of this specification, Figure 1 represents a perspective view of the improved boot unfastened and the overlapping edge of its opening thrown back. Fig. 2 represents a perspective view of my improved boot fastened. Fig. 3 represents a section on line *y y*, Fig. 2. Fig. 4 represents a section on line *x x*, Fig. 1. The same letters of reference indicate the same parts in all the figures.

In carrying out my invention I make a boot similar in all respects to an ordinary button-boot, excepting that it has no button-holes and no operative buttons, although for ornamentation I prefer to apply a series of imitation-buttons, *s*, to the outer surface of the fly.

In the edge of the flap or fly *c*, which overlaps the outside quarter, *a*, of the boot, I insert a spring, *b*, which extends continuously from end to end of said fly, and is preferably composed of two or more leaves or members, each being a single strip or piece of suitably-tempered wire. This spring is placed between the outer and inner thicknesses of the fly, and is secured in place by stitches formed around it.

To the inner side of the fly, at a point preferably between the middle and the lower end of the fly, I attach firmly a cord, *d*, and in the upper end of the fly I form a hole, *i*, which is preferably bushed by an eyelet. The cord *d* is passed upwardly along the inner side of the fly to the hole *i*, and passed through the same, as shown. The cord is provided at a point outside of the fly with an enlargement, *j*, which may be a knot tied in the cord, or, as I prefer, a knob of metal preferably attached to the cord by a small set-screw, so that it can be adjusted to different-sized ankles.

To the outside quarter, *a*, I attach two lacing-hooks, *k k'*, of any suitable form. The lower hook, *k*, which holds and guides the cord, is arranged so that it will be overlapped and concealed by the fly, and will engage the cord *d* near the point where the latter is secured to said fly. The upper hook, *k'*, is located farther back than the lower hook, *k*, so that the fly will not overlap it, as shown in Fig. 2.

The boot is fastened by first engaging the cord *d* with the lower hook, *k*, and then, after it is drawn taut, inserting it in the upper hook, *k'*, so that the enlargement *j* on said cord will bear against one edge of said hook and prevent the cord from slipping backwardly through the hook. When the fly is thus secured, the spring *b* keeps its edge in close contact with the quarter *a*, and prevents the fly from working or moving in the direction of its length, so that the cord *d* cannot be disengaged from the hook *k* so long as its enlargement *j* is held by the hook *k'*.

It will be seen that by this improvement the fly can be very easily and quickly secured, and by the use of one hand only.

I prefer to place under each lacing-hook a thin metal plate, *m*, interposed between the outer and inner thicknesses of the quarter, and secured by the eyelet or rivet that secures the hook. Said plate prevents the hook from tipping and thus injuring the wearer's foot.

By making the spring *b* in the fly of two leaves or strips I not only obtain greater elasticity, but also greater durability. In case of the breakage of one strip the other will continue to act and keep the device operative.

I am aware that a spring has been inserted in the overlapping edge of a boot-upper, and therefore I do not claim the same, broadly.

I claim—

1. In a boot of the class herein described, the combination of the quarter, the flap or fly formed to overlap the quarter and provided with a spring in its edge, a flexible cord attached to the fly and extending along the inner side of the same, a guiding-hook, *k*, for the cord attached to the quarter under the fly, and a holder for the end of the cord outside of the fly, as set forth.

2. A boot of the class herein described, having the flap or fly formed to overlap the quarter and provided with a spring, *b*, in its edge, and with an orifice, *i*, at its upper end, the cord *d*, attached at one end to the inner side of the fly and passed along said inner side to and through the orifice *i*, a hook arranged to detachably secure the cord to the quarter between the attached end of the cord and the orifice *i*, and means for securing the cord to the upper portion of the quarter, as set forth.

3. A boot of the class herein described, having the flap or fly formed to overlap the quarter and provided with a spring, *b*, in its edge, and with an orifice, *i*, in its upper end, the cord *d*, attached at one end to the inner side of the fly and passed along said inner side to and through the orifice *i*, and provided with the enlargement *j*, the hook *k*, arranged to be covered by the fly and to engage the cord near its point of attachment with the fly, and the hook *k'*, arranged above the hook *k* in position to receive the cord *d* and engage the enlargement thereof, as set forth.

4. The flap or fly having a spring inserted in its edge, composed of a plurality of strips of metal, as set forth.

5. The boot having the fly *c*, spring *b*, orifice *i*, and hooks *k k'*, combined with the lacing-cord attached at one end to the inner side of the fly, and provided with the adjustable enlargement *j*, as set forth.

In testimony whereof I have signed my name to this specification, in the presence of two subscribing witnesses, this 2d day of February, A. D. 1888.

CHARLES F. MARTINE.

Witnesses:
CHAS. E. WHITMORE,
ARTHUR W. CROSSLEY.